May 23, 1939.  J. VISSER  2,159,061
ASH RECEIVER
Original Filed March 29, 1935   2 Sheets-Sheet 1
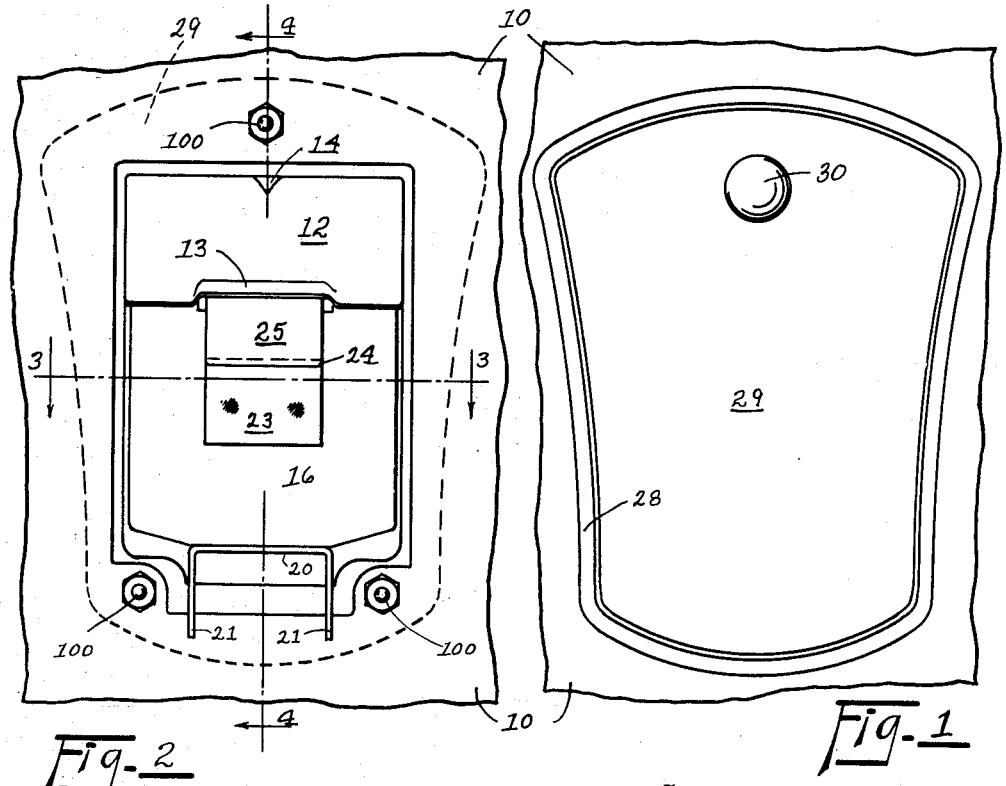
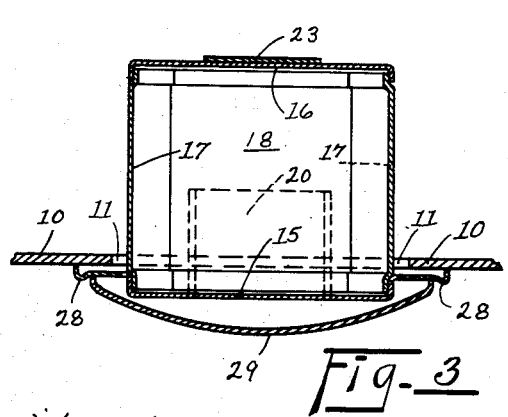
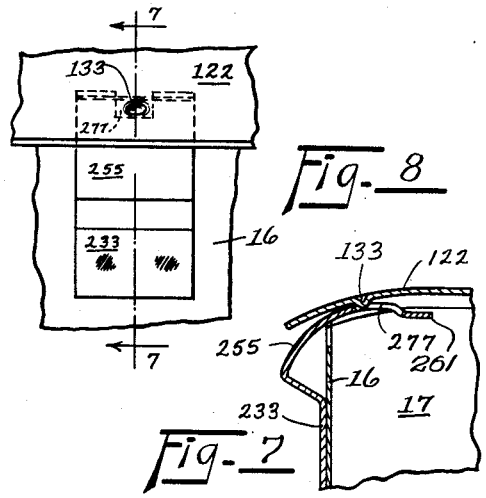
Witness:
Geo L Chapel
Inventor
John Visser
By Rice and Rice
Attorneys May 23, 1939.　　　　　J. VISSER　　　　　2,159,061
ASH RECEIVER
Original Filed March 29, 1935　　2 Sheets-Sheet 2
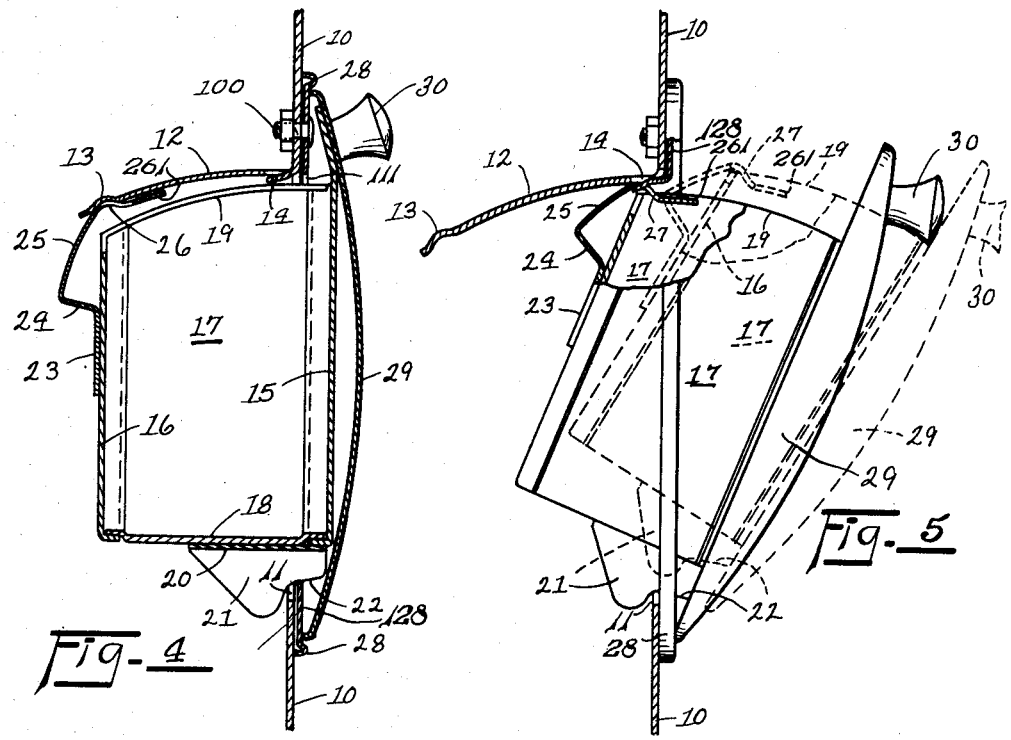
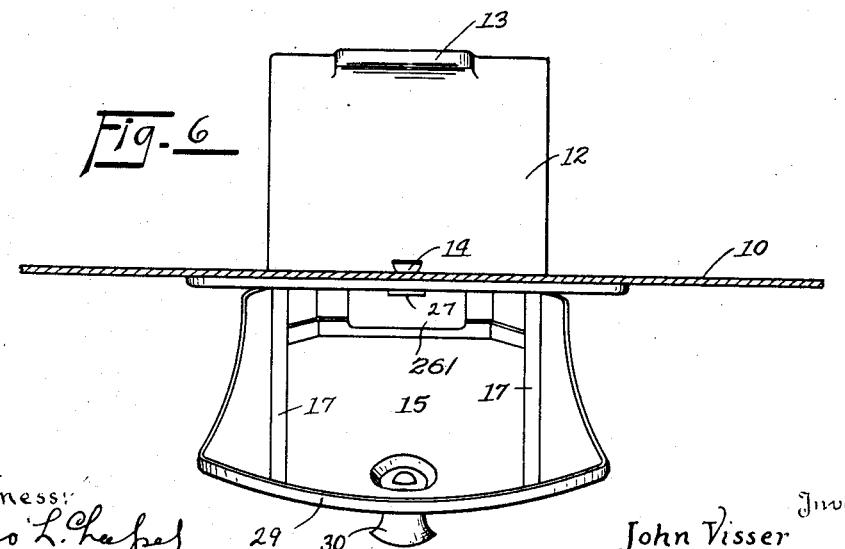
Witness:
Geo. L. Chapel
Inventor
John Visser
By Rice and Rice
Attorneys Patented May 23, 1939

2,159,061

UNITED STATES PATENT OFFICE 2,159,061

ASH RECEIVER

John Visser, Grand Rapids, Mich.

Application March 29, 1935, Serial No. 13,690
Renewed July 5, 1938

14 Claims. (Cl. 206—19.5)

The instant invention relates to ash receivers and more particularly to such devices as are especially adapted for insertion within and removal from an opening within an interior wall of a motor car.

The present invention is of the general character illustrated and described in De Boer Patent No. 1,960,868, issued May 29, 1934, on application filed March 26, 1934, Serial No. 717,385, but is an improvement thereover in both economical manufacture installation and operation.

The primary objects of the invention are to provide a device of the character above indicated which is adapted for ready reception within and convenient removal from an opening through a supporting plate such as the dash panel of a motor vehicle; to provide such a device which may be adjustably tilted within such opening from closed position to open position for use; to provide such a device which is substantially flush with the supporting plate upon which it is mounted when in its closed position; to provide such a device having a rigid hinge mounting operably maintained during its tilting movement from closed to open position by means of an oppositely disposed spring tensioned element; to provide such a device which is rattle proof upon insertion within its receiving opening; to provide such a device whose supporting plate has a portion flanged rearwardly therefrom to form a cover for the container portion of the device in its closed position and which is likewise provided with a stop limiting the opening tilting movement of the device; and, to provide such a device which is attractive in appearance, economical in manufacture and utilitarian in use.

Illustrative embodiments of the invention are shown in the accompanying drawings, wherein:

Figure 1 is a front elevational view of the device shown in its closed position when mounted upon its supporting plate;

Figure 2 is a rear elevational view thereof;

Figure 3 is a sectional view on line 3—3 of Figure 2;

Figure 4 is a sectional view thereof on line 4—4 of Figure 2;

Figure 5 is a side elevational view of the device tilted to open position, partly in section and with a portion thereof being broken away to better illustrate its tilting operation, the manner of inserting the container portion of the device within the opening of the supporting plate being indicated in dotted lines;

Figure 6 is a top plan view of the device in its open tilted position, and shows clearly the free end portion of the spring that is to be manually depressed when it is desired to remove the container;

Figure 7 is a fragmentary sectional view of a modified form on line 7—7 of Figure 8; and Figure 8 is a fragmentary rear elevational view of the modified form illustrated in Figure 7.

Referring to the drawings and firstly to Figures 1 to 6 inclusive wherein like parts of the device and its mounting support there shown are designated by the same numerals in the several views, a supporting plate 10, such as the dash panel of a motor vehicle, is provided with an opening 11 therein formed therethrough. A mounting plate 128 is provided having an ornamental beaded edge 28, an opening 111 corresponding generally in shape, but smaller than the opening 11 in the plate 10 and having a rearwardly struck integrally formed arcuate cover portion 12, which entirely covers the open top of the container when in closed position. The outer end of the arcuate portion 12 is transversely formed with a rib 13 providing a locking detent for preventing rattling of the device when in its closed position and its forward end is provided with a struck-out portion 14 forming a stop for governing the opening tilting movement thereof all as best shown in Figures 4 and 5 and hereinafter presently described.

A container for the reception of ashes and the like is provided for tilting movement within the opening 111 and comprises a front portion or plate 15, a rear portion or plate 16, side members or plates 17 disposed and secured between the front and rear plates in spaced relation, and a base plate 18, all preferably of stamped sheet metal, the upper ends 19 of the side plates being of arcuate form.

Secured to the under surface of the base plate 18 is a rigid hinge plate 20 having spaced downwardly depending flanged portions 21 whose inner recessed portions 22 are adapted to form fulcrums for the tiltable container against the bottom marginal edge of the opening 111 as best shown in Figures 4 and 5.

A spring member 23 secured to the outer surface of the back plate 16 as by spot welding is provided with an outwardly turned portion 24 and with an upwardly-forwardly turned portion 25. This upwardly-forwardly turned portion is provided with a ribbed portion 26 (see Figure 4) adapted to seat in the rib 13 when the device is in closed position as shown in Figure 4 which ribbed portion is provided with a transverse slot 27 through a part thereof (see Figure 5) adapted to be engaged by the struck-out portion 14 when the device is tilted forwardly to open position for use as shown in Figure 5. The free end 261 of the spring member 23 extends forwardly as best shown in Figures 5 and 6 into position where it may be manually depressed to release the contact between the stop 14 and the slot 27 so that the container may be readily removed from the opening 111 when it is desired to empty the contents thereof.

The mounting plate 128 is preferably provided with an ornamental rim 28 (see Figures 3 and 4) and is secured to the plate 10 by bolts 100. An ornamental face plate 29, for the container, is secured to the front plate 15 as by spot welding or by a knob and bolt. A pull or knob 30 is secured to the face plate adapting the device for tiltable movement upon the lower edge within the opening 11 of the supporting plate or dash panel 10.

In the modified construction shown in Figures 7 and 8, the arcuate portion 122 is provided with an indentation 133 rather than with the rib 13 which drops into the slot 277 of the portion 255 of the spring of the opening 111 in the mounting plate 128 and member 233 when the device is swung to closed position.

In operation, the downwardly depending flanged portions 21 of the hinge plate 20 are disposed rearwardly of the lower marginal surface of the opening 111 of the mounting plate 128 as best indicated in Figure 4. Since the member 23 is flexible, the portion 25 is depressed as the device is tilted from the open position shown in Figure 5 to the closed position shown in Figure 4.

Thus when the device is in its closed position, the arcuate portion 12 forms a cover for the device and its rib 13 engages the registering rib 26 to prevent rattling of the device. When the device is tilted to open position for use as shown in Figure 5, the struck-out portion 14 engages within the slot 27 preventing further forward tilting movement of the device relative to its supporting plate 10. The portion 25 of the spring member 23 is always under tension when the device is in its inserted position permitting of an adjustable tilting disposition of the device relative to its supporting plate.

To remove the device from its assembly within its opening 111, it is first tilted forwardly from the position shown in Figure 4 to the position shown in Figures 5 and 6 whereupon the forward end 261 of the spring 23 may be manually depressed permitting the slot 27 to escape its stop 14. The device may then be lifted upwardly and outwardly as shown by the dotted lines in Figure 5 permitting emptying of ashes or the like within the container portion thereof.

In the preferred form as shown a mounting plate 128 with a bead 28 is used and is in many cases the desired method of mounting the container to a supporting wall. It is to be understood that this plate may be used or omitted as desired without departing from this invention.

In many instances it is desired to mount the container directly upon the edge of the opening in the wall, as is often done when the container is mounted in the instrument panel of an automobile. In this case the cover portion 12 may be integral with the supporting wall or fastened thereto as desired. In such cases the container with the ornamental face cover plate and the hinge parts attached is sold and shipped as a complete unit ready for installation in the opening in the instrument panel.

It will thus be seen that the devices herein shown and described may be readily inserted and seated within and conveniently removed from the opening in the supporting plate and that the device is economical in manufacture, attractive in appearance and utilitarian in use.

While but several specific embodiments of this invention have been herein shown and described, it will be understood that numerous details of the constructions shown may be altered or omitted without departing from the spirit of this invention as defined by the following claims.

I claim:

1. In an ash receiver the combination of a supporting plate having an opening therein, an open top ash receiving box adapted for tilting movement within said opening, a cover above said box when in closed position formed by laterally flanging a portion of said plate, said box being provided with a rigid hinge part having cam shaped engaging portions adapted to be seated upon the lower edge of said opening and forming a fulcrum, and a leaf spring secured to the rear wall of said box and extending upwardly therefrom, then forwardly, then downwardly and again forwardly to form at the extreme upward part a contract rib across the width of said spring disposed to engage said laterally extending cover for exerting pressure of the fulcrum against said edge portion, the center portion of said rib being cut away, stop means in said cover for engagement in the cut away portion of said spring for stopping the forward tilting movement of said box when the top opening of said box is in front of said wall, the second said forwardly extending portion of said spring comprising a free end portion extending forwardly beyond said plate when said box is tilted to expose said top opening whereby said spring may be released from said stop by manual actuation for removal of said box from said opening.

2. In a concealed type ash receiver, the combination of a supporting wall having an opening therein, a mounting panel having an opening therein and means for securing said panel to said wall with said openings in substantial alignment, an open top ash receiver, a rigid hinge part secured to said ash receiver adjacent its lower front edge, said part having a cam shaped engaging portion whereby said ash receiver may be mounted to pivot upon the lower edge of the opening in said mounting panel for pivotal movement about its lower front edge, a laterally extending member rigid with said mounting panel and forming a cover for said receiver when in closed position, a leaf spring attached to the rear wall of said receiver and extending forwardly adjacent the open top thereof, a cross rib formed in said spring for contacting against said laterally extending cover member to continuously force said receiver towards said edge during rocking movement thereof, an ornamental front panel secured to said receiver said front panel having its perimeter formed into a rearwardly extending flange which by contact against said mounting panel limits rocking movement of said receiver in the direction of closure.

3. In a concealed type ash receiver, the combination of a supporting wall having an opening therein, a mounting panel having an opening therein and means for securing said mounting panel to said wall with said openings in substantial alignment, an open top ash receiver, a rigid hinge part secured to said ash receiver adjacent its lower front edge said part having a cam shaped engaging portion whereby said receiver may be detachably mounted to pivot upon the lower edge of the opening in said mounting panel, a laterally extending member rigid with said mounting panel and forming a cover for said receiver when in closed position, a spring attached to said receiver and extending forwardly adjacent the open top thereof, a cross-rib formed in said spring for contacting against said laterally extending cover member to continuously force said receiver towards said edge during rocking movement thereof, the center portion of said rib in said spring being cut away and a stop lug protruding downwardly from said cover and in the path of movement of the said cut away part of said rib whereby the movement of said receiver towards open position is arrested.

4. In an ash receiver the combination of a supporting wall having an opening therein, an open top ash receiving box, a rigid hinge part secured to said box, said part having a cam shaped portion for mounting said box for rocking movement within said opening and open the lower edge thereof, a laterally extending member attached to said wall, disposed above said box and forming a cover therefor when in closed position, and a resilient spring coacting between said cover and said box for yieldingly retaining said box in any adjusted position said spring having adjacent its free end portion a crosswise contacting rib, a portion of said rib being provided with means for contacting a stop, detent means coacting between said spring and said cover member for yieldingly holding said box in closed position and stop means coacting between said cover and said spring for stopping the rocking movement of said box to expose said top opening, said spring having a free end portion extending forwardly beyond said wall when said ash receiving box is rocked to expose said top opening whereby said spring may be manually actuated to release it from said stop means for removal of said box from said opening for emptying the contents thereof.

5. An ash receiving container having in combination a bottom wall, a front wall, a rear wall, two side walls forming an opening top box, a rigid hinge part secured to said container and having a cam portion whereby said container may be mounted for tilting movement about its lower front edge, an ornamental front panel attached to said front wall and a cantilever type leaf spring attached to said box and extending forwardly adjacent the open top of said box, said spring having an upwardly projecting intermediate portion the top of which forms a rib, an aperture in said rib and a free end portion projecting forwardly of said rib providing means for manual actuation of said spring.

6. In an ash receiver the combination of a mounting panel having an opening therein, a stiffening bead adjacent its outer edge and a laterally extending portion integral therewith formed by bending back the stock of the panel adjacent the upper edge of the opening therein said portion being shaped into arcuate form to act as a cover for said ash receiver when in closed position means for securing said panel to a supporting wall, an open top ash receiving box smaller than the opening in said mounting panel, a rigid hinge part secured to said box adjacent the bottom wall thereof, said part having a cam shaped portion for pivotally mounting said box upon the lower edge of the opening in said mounting panel for tilting movement therein, said box having side walls, the top edges of which are arcuate in form and disposed under and in close proximity to said cover, a cantilever type leaf spring having an end portion attached to said box, an intermediate portion formed into a rib for exerting pressure contact against said cover during all tilting movements of said box, and a free end portion extending forwardly adjacent the open top of said box and beyond said mounting panel when said box is tilted forwardly to expose said top opening, said rib having an aperture therein, said cover adjacent its rear edge having detent means cooperating with mating means on said spring for releasably retaining said box in closed position, said cover also having adjacent its front end positive stop means cooperating with said spring to positively stop said box when rocked forwardly to expose said top opening, the free end portion of said spring providing means for manually actuating said spring to release engagement from said stop means when said box is to be removed from said mounting panel for emptying the contents thereof.

7. The combination of claim 6 with the positive stop means adjacent the front end of the cover comprising, a rib in the cover stock struck downwardly and having a rearwardly facing surface forming a stop for said spring during forward tilting movement of said box and a sloping surface extending forwardly from said stop to assist in the reinsertion of said box in said opening.

8. A mounting panel for ash receivers having a rectangular opening therein, a stiffening rib adjacent the perimeter of said panel, means whereby said panel may be secured to a supporting wall a laterally extending integral portion formed by bending laterally adjacent the upper edge of said opening the material cut out to form said opening, said integral portion also being shaped into arcuate form, an upwardly formed rib in said laterally extending portion adjacent its rear edge, and a tongue projecting downwardly from said laterally extending portion adjacent its forward end.

9. An ash receiver comprising a supporting structure having a cover, an ash container hingedly mounted in said structure for arcuate movement therein and having one of its sides provided with a resilient portion, said resilient portion being constructed and arranged to exert at all times when the container is in the structure a container retaining pressure directly against said cover, but being disengageable therefrom by the flexing of said resilient portion to remove the container from the structure said container having its bottom side provided with a rigid hinge member having a notched bearing edge for hingedly embracing said supporting structure.

10. In an ash receiver assembly, the combination comprising a supporting panel structure having an opening therein, an ash container disposed for rotational movement through said opening, having one of its sides provided with a resilient portion, said container having on its bottom side a bearing portion adapted to be seated upon an edge of said opening, said panel structure having a rearwardly extending portion disposed on the opposite side of said opening from said container engaging edge, said resilient portion being arranged to slidably engage said rearwardly extending portion to exert at all times when the container is in the structure a container retaining pressure against said rearwardly extending portion, but being disengageable therefrom by the flexing of said resilient portion to remove the container from the panel structure.

11. In an ash receiver assembly, the combination comprising a supporting panel structure having an opening therein, an ash container disposed for movement through said opening, comprising a hollow body slidably mounted in said structure for arcuate movement therein and having provided on one of its sides a resilient element, said container having on its bottom side a bearing portion adapted to be seated upon a lower portion of said structure, said panel structure having a rearwardly extending upper frame member disposed on the opposite side of said opening from said lower container engaging portion, said resilient element being constructed and arranged to extend between said container body and frame member in slidable engagement with one of them to exert at all times when the container is in the structure a container retaining pressure, but being disengageable upon arcuate movement of said container in a direction to remove said container from said structure and upon the flexing of said resilient element, said upper member and lower portion of said frame structure cooperating to define a support into and out of which said container body is movable in an arcuate path and under the tension of said resilient element.

12. In an ash receiver assembly, the combination comprising a supporting panel structure having an opening therein, an ash container disposed for movement through said opening, comprising a hollow body slidably mounted in said structure for arcuate movement therein and having provided on one of its sides a resilient element, said container having on its bottom side a bearing portion adapted to be seated upon a lower portion of said structure, said panel structure having a rearwardly extending upper frame member disposed on the opposite side of said opening from said lower container engaging portion, said resilient element being constructed and arranged to extend between said container body and frame member in slidable engagement with one of them to exert at all times, when the container is in the structure, a container retaining pressure, but being disengageable upon arcuate movement of said container in a direction to remove said container from said structure and upon the flexing of said resilient element, said upper member and lower portion of said frame structure cooperating to define a support into and out of which said container body is movable in an arcuate path and under the tension of said resilient element, said resilient element comprising a spring having a free goose-neck portion which is flexible upon the application of manual pressure to release the container for removal from said container body.

13. An ash receiver assembly comprising a supporting structure provided with an upper frame and covering member, an ash container member having an open top covered by said frame member and including a hollow body slidably mounted in said structure for arcuate movement therein, a resilient element constructed and arranged to extend between said container body and said frame member, said element being secured to one of said members and in sliding and detachable engagement with the other to exert at all times when said container member is in said structure a container retaining pressure but being disengageable upon arcuate movement of said container member in a direction to remove said container member from said structure and by the flexure of said resilient element, said container member having on its bottom a rigid curved bearing surface between said container body and said structure constructed and arranged to enable said container member to be bodily slid over an arcuate path into and out of said structure under the tension of said resilient element.

14. An ash receiver assembly comprising a supporting structure provided with an upper frame member, an ash container member having an open top covered by said frame member and mounted in said structure for arcuate movement, a resilient element at the top of said container member and extending between it and said frame member, said resilient element being secured to one of said members and in sliding engagement with the other to exert, when said container member is in said structure, a retaining pressure, and disengageable by the arcuate movement of said container member in a direction to remove said container member from said structure, said container member having on its bottom side a curved bearing surface between it and the supporting structure whereby said container member may be bodily swung and slid along an arcuate path under the tension of said resilient element.

JOHN VISSER.

CERTIFICATE OF CORRECTION.

Patent No. 2,159,061.  May 23, 1939.

JOHN VISSER.

It is hereby certified that error appears in the printed specification of the above numbered patent requiring correction as follows: Page 2, second column, line 27, claim 1, for the word "contract" read contact; page 3, first column, line 48, claim 5, for "opening" read open; and that the said Letters Patent should be read with this correction therein that the same may conform to the record of the case in the Patent Office.

Signed and sealed this 22nd day of August, A. D. 1939.

Leslie Frazer (Seal)　　　　　　　　　　　Acting Commissioner of Patents.